Patented Apr. 30, 1935

1,999,750

UNITED STATES PATENT OFFICE 1,999,750

STABLE AQUEOUS SOLUTIONS OF BASIC ORGANIC DYESTUFFS AND SULPHONATED DYESTUFFS AND PROCESS OF PREPARING THEM

Louis Benda, Frankfort-on-the-Main, Germany, assignor to Winthrop Chemical Company, Inc., New York, N. Y., a corporation of New York No Drawing. Application April 4, 1932, Serial No. 603,200. In Germany April 16, 1931

6 Claims. (Cl. 167—65)

The present invention relates to stable aqueous solutions of basic organic dyestuffs and sulphonated dyestuffs used as therapeutics, and to a process of preparing them.

Certain basic organic dyestuffs, such as 3.6-diaminoacridine, 3.6-diamino-10-methylacridinium chloride, and also sulphonated dyestuffs, for instance, trypan-blue (see Schultz, "Farbstofftabellen", 1923, No. 391), trypan-red (see Schultz, "Farbstofftabellen", 1923, No. 359) are, as is known, used in therapy for injecting purposes. The trypan-blue has proved to be particularly suitable in the case of certain infectious diseases, particularly for the piroplasmose of cattle and dogs. Amino-acridines, for instance, 3.6-diamino-10-methylacridinium chloride, have also a particularly good action. It has been impossible hitherto to use together, as frequently desired, these products or to use together other basic dyestuffs and sulphonic acids, since the salts formed on the one hand from the basic compound and, on the other hand, from the sulphonic acid, are insoluble in water and separate when the two solutions, which contain equimolecular proportions thereof, are mixed.

Now I have found that stable aqueous solutions containing basic organic dyestuffs and sulphonated dyestuffs used as therapeutics can be easily prepared by dissolving a basic organic dyestuff, for instance, a basic acridine compound, in water in the presence of an excess of a sulphonated dyestuff. As sulphonated dyestuffs which are suitable for this purpose there are preferably used disazo dyestuffs containing sulphonic acid groups, such as trypan-blue or trypan-red. As basic compounds there may be preferably used acridine derivatives, furthermore other basic dyestuffs, used as therapeutics, such as thiazines and compounds of the triarylmethane series.

The process may be carried out by adding a basic compound or an aqueous solution of such a compound to an aqueous solution of a sulphonated dyestuff, of which a greater quantity has been dissolved than is necessary to form a salt in molecular proportions by the action of the sulphonic acid or the basic compound. Instead of first dissolving the sulphonic acid and then adding the basic compound, the two compounds may be mixed in a dry state in the proportions above indicated, i. e. a mixture is formed which does not contain equimolecular quantities of the sulphonic acid and the base, but contains an excess of the sulphonic acid; this mixture may be dissolved in water.

The process may also be carried out by first preparing a salt of the sulphonic acid and the basic compound, which salt as mentioned above is insoluble in water. The salt can be easily dissolved in an aqueous solution of a sulphonic acid. The latter may be identical with the sulphonic acid contained as acid component in the salt which is to be dissolved, but any other sulphonated dyestuff having therapeutic properties may also be used.

The aqueous solutions of basic compounds and sulphonated dyestuffs obtained according to this process can be used for therapeutic purposes, especially for injections, for example when treating certain infectious diseases of cattle and dogs.

The following examples illustrate the invention:

1. 140 liters of a solution of 1 per cent. strength of trypan-blue (dyestuff from tetrazotized tolidine and 2 molecular proportions of 1-amino-8-hydroxynaphthalene-3.6-disulphonic acid) are mixed at 70° C. with 100 liters of a solution of 1 per cent. strength of 3.6-diamino-10-methylacridinium chloride. The mixture is filtered and the solid matter is made into a paste amounting to 50 kilos by addition of water.

10 kilos of this paste are introduced, while stirring, at 70° C. into 80 liters of a solution of 1 per cent. strength of trypan-blue. The temperature is kept for some time at 70° C., while stirring. The bluish-green solution thus formed may, after sterilization, be used directly for injecting purposes.

2. 1.5 kilos of 3.6-diamino-10-methylacridinium chloride are dissolved in 150 liters of hot water and the solution is mixed with a solution of 8.5 kilos of trypan-blue in 850 liters of water. After the bluish-green solution thus obtained has been sterilized, it can be used directly.

3. 35 liters of a solution of 1 per cent. strength of 3.6-diaminoacridine chloride are mixed with 70 liters of a solution of 1 per cent. strength of trypan-blue. The mixture is filtered by suction, the solid matter is washed with water and made into a paste (17.5 kilos) with water. 2 kilos of this paste are well mixed, while stirring, at 70° C. with 16 kilos of a solution of 1 per cent. strength of trypan-blue; a clear green solution is thus obtained.

4. 90 liters of a solution of 1 per cent. strength of 3.6-diamino-10-methylacridinium chloride are mixed at 70° C. with 100 liters of a solution of 1 per cent. strength of the dyestuff from tetrazotized benzidine-monosulphonic acid and 2 molecular proportions of 2-naphthylamine-3.6- disulphonic acid (trypan-red). The precipitate is filtered by suction, washed with water and made into a paste (18 kilos) by addition of water.

3 kilos of this paste are introduced, while stirring, at 70° C. into 85 liters of a solution of 1 per cent. strength of trypan-red. After the red solution thus obtained has been sterilized, it may be used directly.

5. 20 liters of a solution of 1 per cent. strength of trypan-blue are mixed at 70° C. with 23 liters of a solution of 1 per cent. strength of methylene blue medicinale, the precipitate is washed with water and made into a paste amounting to 10 kilos by addition of water. This paste is then dissolved at 70° C. in 30 liters of a solution of 1 per cent. strength of trypan-blue. After the bluish-violet solution thus obtained has been sterilized, it may be used directly for injecting purposes.

6. 10 liters of a solution of 1 per cent. strength of acid fuchsine (see Schultz, "Farbstofftabellen", 1923, No. 524) are mixed at 70° C. with 9 liters of a solution of 1 per cent. strength of 3.6-diamino-10-methylacridinium chloride; the compound separates from the hot mixture in the form of a resinous substance and becomes solid on cooling; the liquid is then poured off and the residue is rubbed with water; the paste thus obtained weighs 1.8 kilos.

0.6 kilo of this paste is dissolved at 70° C. in 12 liters of a solution of 1 per cent. strength of trypan-blue or the same quantity of a solution of 1 per cent. strength of trypan-red; the solutions thus obtained are violet and red respectively.

The water-insoluble salt from methylene blue and acid fuchsine can be dissolved in an analogous manner in solutions of trypan-blue or trypan-red.

7. 1 kilo of a paste containing the dyestuff salt prepared according to Example 1 from 3.6-diamino-10-methylacridinium chloride and trypan-blue is heated at 70° C. with 10 liters of a solution of 1 per cent. strength of trypan-red; a clear reddish-brown solution is obtained.

8. 10 liters of a solution of trypan red (1:100) are mixed at about 70° C. with 9 liters of a solution of 3.6-diamino-10-methylacridinium chloride (1:100); the precipitate is filtered by suction and made into a paste amounting to 1.8 kilos by addition of water.

1.2 kilos of this paste are heated at 70° C. with 24 liters of a solution of trypan-blue (1:100). The clear solution thus obtained has a dirty violet colour.

9. 20 liters of a solution of 1 per cent. strength of trypan-blue and 30 liters of a solution of 1 per cent. strength of methyl violet BB (see Schultz, "Farbstofftabellen", 1923, No. 515) are mixed, while stirring. The precipitate is filtered by suction and washed. The paste thus obtained weighs about 10 kilos.

1 kilo of this paste is introduced, while stirring, into 60 liters of a solution of 1 per cent. strength of trypan-blue, the solution is heated to 70° C. and after 1½ hours filtered at 30° C. The blue solution is sterilized.

I claim:

1. The process of preparing stable aqueous solutions of basic acridine derivatives and sulphonated dyestuffs used as therapeutics which comprises dissolving in water 3.6-diamino-10-methylacridinium chloride in the presence of an excess of a sulphonated dyestuff of the group consisting of trypan-blue, trypan-red and acid fuchsine.

2. An aqueous solution of 3.6-diamino-10-methylacridinium chloride and trypan-blue containing an excess of trypan-blue, said product being a stable solution useful in the therapy, especially for injecting purposes, in the treatment of infectious diseases.

3. An aqueous solution of 3.6-diamino-10-methylacridinium chloride and trypan-red containing an excess of trypan-red, said product being a stable solution useful in the therapy, especially for injecting purposes, in the treatment of infectious diseases.

4. An aqueous solution of 3.6-diamino-10-methylacridinium chloride and acid fuchsine containing an excess of acid fuchsine, said product being a stable solution useful in the therapy, especially for injecting purposes, in the treatment of infectious diseases.

5. Aqueous solutions of basic acridine derivatives and sulphonated dyestuffs used as therapeutics, containing a 3.6-diamino-acridine compound and an excess of a sulphonated dyestuff of the group consisting of trypan-blue, trypan-red and acid fuchsine, said products being stable solutions useful in the therapy, especially for injecting purposes, in the treatment of infectious diseases.

6. The process of preparing stable aqueous solutions of basic acridine derivatives and sulphonated dyestuffs used as therapeutics, which comprises dissolving in water a 3.6-diamino-acridine compound in the presence of an excess of a sulphonated dyestuff of the group consisting of trypan-blue, trypan-red and acid fuchsine.

LOUIS BENDA.